United States Patent [19]
Laurent et al.

[11] Patent Number: 6,048,087
[45] Date of Patent: Apr. 11, 2000

[54] MULTI-COMPARTMENT, ELECTRONIC POCKET PILLBOX

[75] Inventors: Hervé Laurent, Paris; Valérie Oriol, Miribel, both of France

[73] Assignee: Biostat S.A., Levallois-Perret, France

[21] Appl. No.: 09/041,813

[22] Filed: Mar. 12, 1998

[51] Int. Cl.[7] .................................................. G06F 17/00
[52] U.S. Cl. .............................. 364/479.12; 364/479.14; 221/2; 221/7
[58] Field of Search .......................... 364/479.12, 479.14; 221/2, 7, 4, 5, 197; 235/375, 487

[56] References Cited

U.S. PATENT DOCUMENTS

| | | | |
|---|---|---|---|
| 4,473,884 | 9/1984 | Behl | 364/479.12 |
| 4,695,954 | 9/1987 | Rose et al. | 221/2 |
| 4,785,969 | 11/1988 | McLaughlin . | |
| 4,962,491 | 10/1990 | Schaeffer | 221/2 |
| 5,099,463 | 3/1992 | Lloyd et al. . | |
| 5,181,189 | 1/1993 | Hafner | 221/2 |
| 5,200,891 | 4/1993 | Kehr et al. | 364/479.12 |
| 5,826,217 | 10/1998 | Lerner | 364/479.12 |
| 5,850,937 | 12/1998 | Rauche | 221/2 |

FOREIGN PATENT DOCUMENTS

| | | |
|---|---|---|
| 0298627 | 11/1989 | European Pat. Off. . |
| 0429 660 A1 | 6/1991 | European Pat. Off. . |
| 2585151 | 7/1985 | France . |
| 2599252 | 5/1986 | France . |
| 2099803 | 12/1982 | United Kingdom . |
| WO94/04966 | 3/1994 | WIPO . |

*Primary Examiner*—Boris Milef
*Assistant Examiner*—Khoi H. Tran
*Attorney, Agent, or Firm*—Lowe Hauptman Gopstein Gilman & Berner

[57] ABSTRACT

A multi-compartment electronic pocket pillbox includes a microprocessor for loading prescription data into a memory. A circuit controls a display. A flag for each compartment indicates the compartment to be used. Coded prescription data contained in a detachable data medium are loaded into the memory. Each compartment has a pill dispenser adaptable to pharmaceuticals of different forms and various sizes. An automatic controller associated with each compartment controls medication movement from the compartment. Switches determine the compartment from which pills are withdrawn.

15 Claims, 3 Drawing Sheets

MULTI-COMPARTMENT, ELECTRONIC POCKET PILLBOX

FIELD OF INVENTION

The present invention relates to a multi-compartment, electronic pocket pillbox and more particularly, to a pillbox having a memory loaded with prescription data from an external source.

BACKGROUND ART

A multi-compartment, electronic pillbox is already known from the French patent 2,650,426, wherein a substantially large case comprises several drawers and electronic circuitry with a timing program for controlling the taking of medications by triggering an alarm to signal a patient to press a button to open the drawers. This kind of device provides the information that the patient pushed the button for his medications. However, it has the drawback of bulk and does not signal which medications were taken. Furthermore, the electronic circuitry can be programmed only at the pillbox site. Such programming allows data input only in a consecutive manner, first entering the time, then the name of the medication (which is displayed on a screen) and the dosages.

European patent 0,298,627 discloses a pillbox having a given number of compartments, a programming clock and flagging by an indicator of the compartment from which the patient must take his medication. An enabling switch indicates that the medication was taken. Pushing the enabling switch causes storing of the time, date, and identity of medication taken. Programming is manual and requires a large number of steps by a pharmacist. While a bar-code reader can be present at the side of the device to enter certain data by read in, other data still must be entered manually. Also, this device sometimes implies that the patient pushed a button associated with a compartment holding medication to be taken, but it does not offer the assurance that a tablet or capsule was actually taken from the compartment.

French patent 2,599,252 discloses a portable indicator showing, on a screen, the number of medications, the dosages and the times when the patient is to take the medications. This device is portable and programmed by a personal computer connected to the portable device. However, the device of the '252 patent is not a pillbox and can not dispense pills or capsules at desired times, or detect if the pills or capsules have been dispensed.

French patent 2,692,689 discloses a medical-help procedure including a detachable data medium for loading an operational program into a medical device, such as dialysis equipment, sphygmomanometers, glucometers and weighing scales. The operational program checks the operation of the medical device.

European patent 0,554,137 discloses a pocket-type medication dispenser comprising a loader and an optical system for detecting movement of dispensed medication. However, this pocket dispenser is restricted to dispensing a single medication per loader and cannot be used to dispense several medications. Moreover, detection by light-emitting diodes (LEDs) and photocells mounted on the opposite sides relative to a path of the tablets and capsules requires two electric wires for each pill dispensing path to power the LED and the photocell. In this design, a pocket pillbox having six compartments that dispense different medications would require merely to detect medication transit, hooking up a dozen wires to six compartments.

SUMMARY OF THE INVENTION

A first object of the invention is to provide a new and improved multi-compartment pillbox for which the data relating to the medications and dosages and to the times of ingestion are entered in a manner other than by (1) keypad, (2) manual input means or (3) a programming terminal.

This object is attained with a multi-compartment pocket electronic pillbox having a microprocessor electronic circuit controlling a memory storing a prescription, a control circuit for a display, indicators for the compartment to use, circuitry for loading into the memory data contained in a detachable data medium and including the coded prescription, a pill dispensing unit adaptable to various pharmaceutical forms and sizes, a detector at each compartment for automatically detecting the movement of a pill and a detector for automatically ascertaining from which compartment the pill was withdrawn.

Another objective is to provide a new and improved pillbox for checking that a pill indeed was dispensed.

This objective is attained with a compartmented electronic pocket pillbox having a detector for pills as they are withdrawn from a compartment and a counter for counting the number of pills remaining in the compartment.

In another feature of the invention, the pillbox circuitry senses pill emergency withdrawal and stores indications thereof in a memory file.

In yet another feature of the invention, integrated electronic circuitry in the pillbox includes a microprocessor and a liquid crystal display.

In still another feature of the invention, the compartments are removable and include connectors connected to the integrated circuit for controlling pillbox operation and a pillbox integrity checking arrangement.

Another feature of the invention concerns ascertaining the number of compartments.

In another feature, a detector detects the presence and absence of the detachable data medium in the pillbox.

In another feature, the detachable data medium is a card having a size and shape enabling it to be inserted into and removed from the pillbox and includes a microprocessor chip and a programmable non-volatile memory.

In another feature, a sensor for the movement of the pill from each removable compartment includes a switch actuated by the moving pill.

In another feature, the presence of the compartments in the pillbox is determined by a circuit including a resistor associated with each compartment. The resistors are series-connected to an analog-digital converter and by a button-controlled switch driving the dispenser of each compartment. Each switch has a first terminal connected between a tap of a resistive voltage divider and a second terminal connected to a DC power supply terminal.

In another feature, the microprocessor detects and records the patient's execution of the prescription, the emergency medication withdrawals and pillbox operational disturbances.

In another feature, the microprocessor program manages data exchanges with the detachable data medium so the prescription memory is loaded while implementing pillbox integrity and data indicative of execution of treatment and emergency medication withdrawals are loaded into the detachable data medium.

In another feature, storage of treatment execution and emergency medication withdrawals is carried out when the prescription is detected as being completed.

In another feature, the storage of treatment execution and emergency medication withdrawals is carried out each time a dispensing switch is activated.

Another object of the invention is to provide a new and improved electronic pillbox having a restricted number of electrical connections.

This objective is attained by electrically connecting an integrated circuit to each compartment fitted with a medication dispensing mechanism, wherein the compartments comprise a detector for actuation of the pill dispensers. The actuation detectors include switches driven by a button actuating the dispenser of each compartment. The switch of each compartment is connected between a resistor associated with the particular compartment and the electric circuit power supply. Each compartment resistor is in series with that of the following compartment and connected by an additional resistor to the input of an analog-digital converter having an output indicative of compartment identity as a function of the amplitude of the analog signal supplied to the converter.

The above and still further objects, features and advantages of the present invention will become apparent upon consideration of the following detailed description of the specific embodiment thereof, especially when taken in conjunction with the accompanying drawings.

DESCRIPTION OF THE PREFERRED EMBODIMENT

Figure 3A:
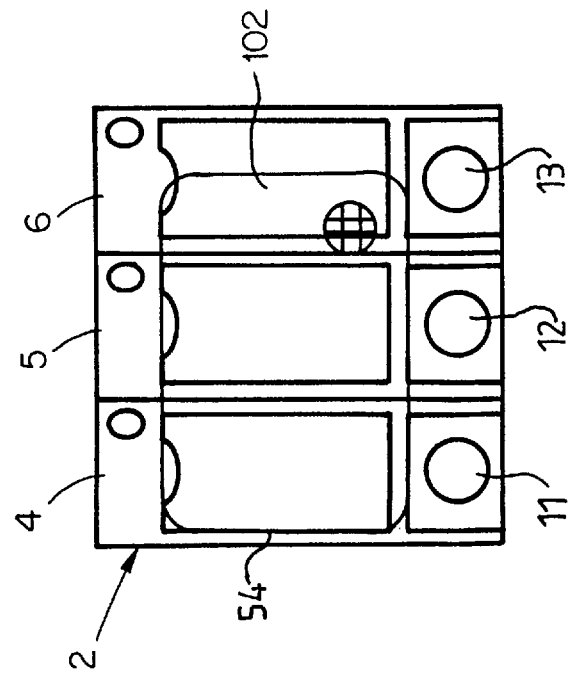
FIG. 3a is a schematic view of an assembled pocket pillbox including the circuit of FIG. 1 and display of FIG. 2.

As shown in FIG. 3A, a modular pocket pillbox including an electronic circuit comprises a given number of detachable modular compartments for dispensing medications, e.g., pills, having different geometries and sizes; pillbox 2 is illustrated for convenience as including three side-by-side identical compartments 4, 5 and 6; the number of compartments is usually matched to the number of different medications taken by the pillbox possessor. In the preferred embodiment discussed in connection with FIGS. 1 and 2, there are five compartments. Further details of pillbox 2 are disclosed in the co-pending U.S. patent application Ser. No. 09/041,448 "Modular Pocket Medication Dispenser" filed concurrently herewith by applicants (Lowe Hauptman Gopstein & Berner docket number 1013-007), the subject matter of which is incorporated herein by reference. Each of compartments 4, 5 and 6 contains a number of pills as disclosed in the co-pending application. Upon actuation of dispensing buttons 11, 12, 13, the pills in compartments 4, 5 and 6, respectively move through pivoting doors 14, 15, 16 (FIG. 3c) into a holding space in the pillbox.

Figure 1:
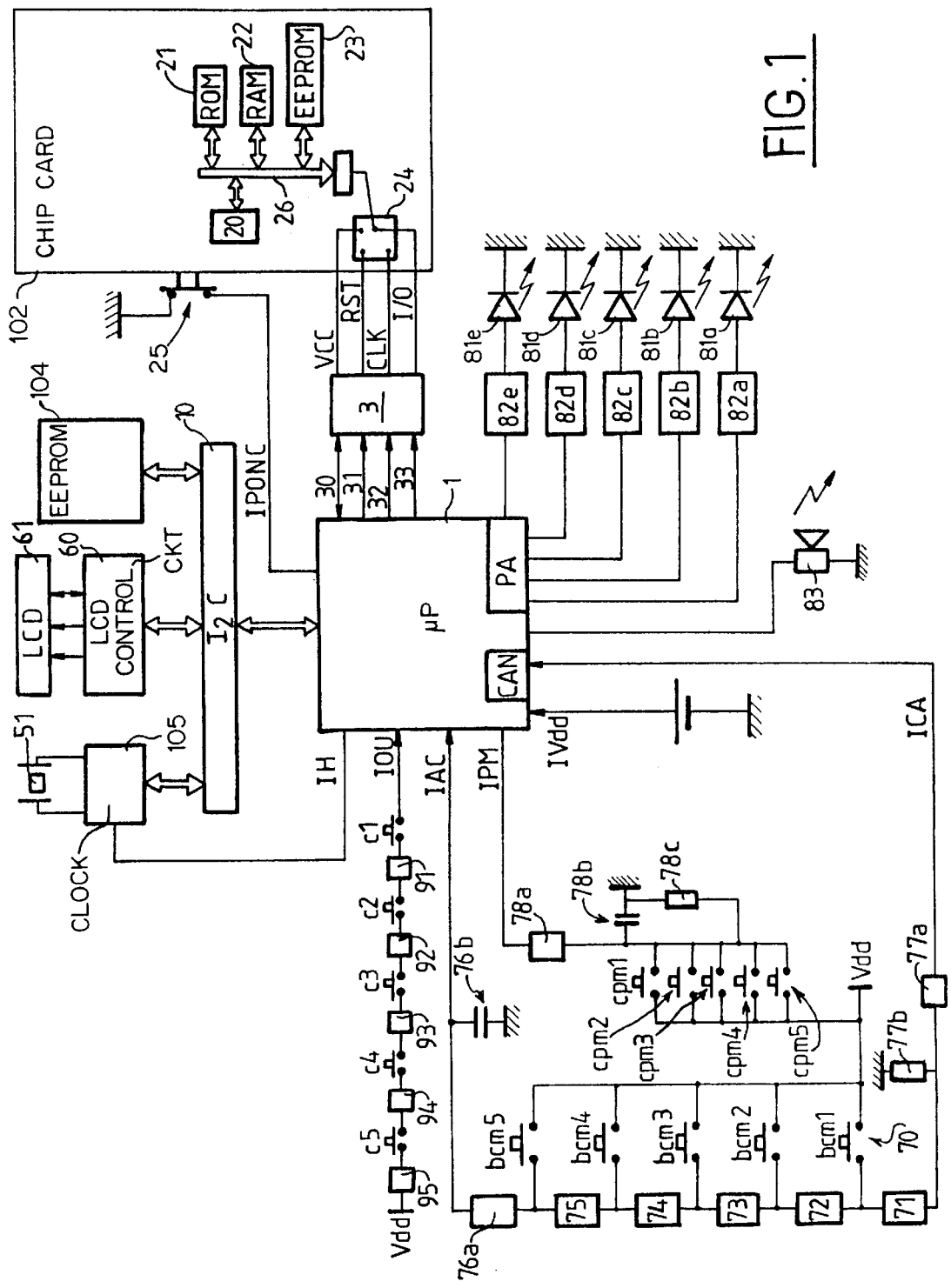
FIG. 1 is a block diagram of a preferred embodiment of an electronic circuit included in the pillbox of the invention.
Figure 3C:
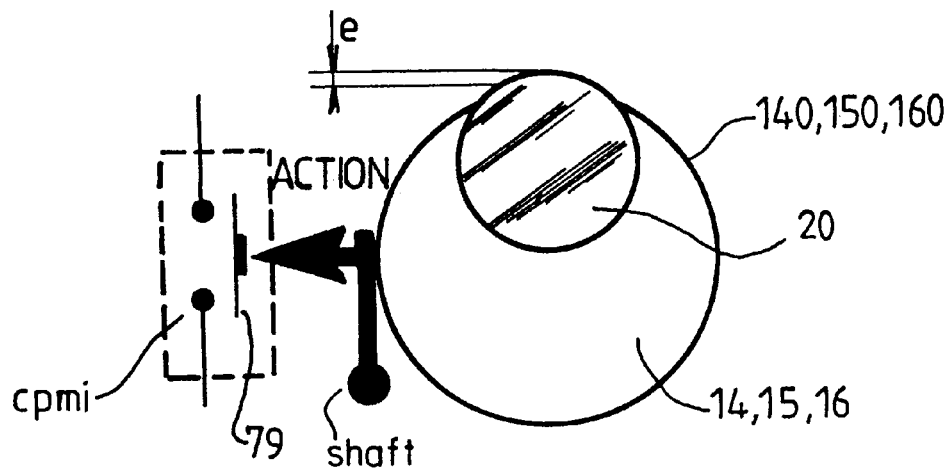
FIG. 3c is a schematic diagram of an arrangement for detecting medication transit through the pillbox of FIG. 3c.
Figure 3B:
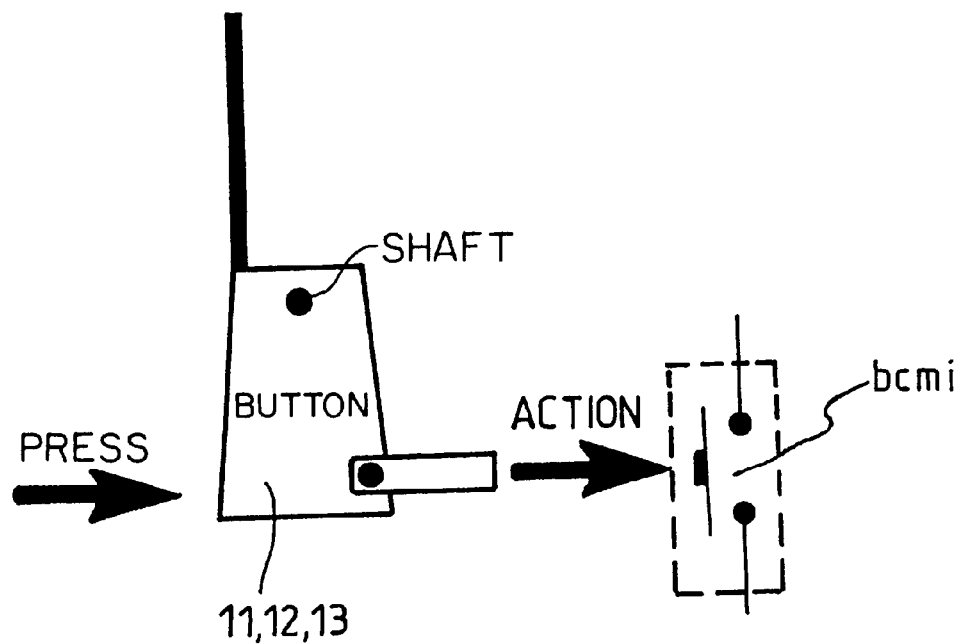
FIG. 3b is a schematic diagram of an arrangement for detecting pressure on a dispensing button of the pillbox.

As shown in FIG. 3b, pressing dispensing button 11, 12, 13 of modular compartments 4, 5, 6 of pillbox 2 of FIG. 3a causes closure of a switch bcmi for the driven module; in FIG. 1, five bcmi switches are shown as switches bcm1 through bcm5. The button 11, 12, 13 of the driven compartment mechanically causes an associated door 14, 15, 16 to rotate; doors 14, 15 and 16 are sized so that the capsule, i.e., pill, 20 slightly projects outside the outer contour 140, 150, 160 (FIG. 3c) of doors 14, 15, 16 and actuates the movable contact 79 of a microswitch epmi of the modular compartment. Contact 79 thereby detects movement of each pill 20 through each door 14, 15, 16 from compartments 4, 5, 6. A first stationary contact of each of medication-transit detecting microswitches cmp1 through cmp5 (FIG. 1) is electrically connected in parallel with the other first contacts so one first contact of each microswitch is connected to DC supply voltage Vdd. The second stationary terminal of each microswitch cpmi is connected through a first resistor 78a to medication transit interrupt input IPM of microprocessor 1, preferably a PIC 16Fc 74 available from Microchip Co. Movable contacts of microswitches cpm1–cpm5 connect the respective first and second stationary contacts of the microswitches together in response to a pill 20 moving through doors 14, 15, 16 as a result of the mechanism illustrated in FIG. 3c. A grounded, smoothing shunt capacitor 78b is connected between the parallel-connected second stationary contact of microswitches cpm1–cpm5 and resistor 78a, connected in series between the second stationary contacts and input IPM. Resistor 78c is connected in parallel with the capacitor 78b. In this manner, using a single interrupt line connected to interrupt input IPM of microprocessor 1, the microprocessor detects movement of pills 20 from each compartment 4, 5 and 6 of pillbox 20.

The switch bcmi driven by dispensing buttons 11, 12, 13 of compartments 4, 5, 6 allows the system to identify, by means of the circuit described infra, the particular compartment from which a pill is dispensed. A first stationary terminal of each of microswitches bcm1–bcm5 is connected to the DC supply voltage Vdd whereas the other stationary terminal of each of microswitches bcm1–bcm5 is connected to the respective common tap between two adjacent resistors of a set of six series-connected, stacked resistors 71 through 75 and 76a. Resistor 76a also is connected to a compartment depressing interrupt input IAC of microprocessor 1.

The first resistor 71 of the set of six resistors is connected by resistor 77a to driven compartment switch identifying interrupt input ICA, which drives analog-to-digital converter CAN of microprocessor 1. A common terminal of resistors 71 and 77a is connected by resistor 77b to ground. As disclosed in the co-pending application, each pillbox compartment includes a multi-pin connector. One pin of each connector is connected by an electric conductor to output port PA of microprocessor 1. Ports PA are respectively connected to a separate ungrounded output resistor 82a–82e; resistors 82a–82e are respectively connected to ground via a separate light emitting diode (LED) 81a–81e. The first LED 81a is associated with the first pillbox compartment. The cathode of first LED 81a therefore need not be connected by a connector to microprocessor circuit 1. The pin of each pillbox compartment is connected to a pin of the next compartment and to a pin of the preceding compartment by an electric circuit; the pins are in a male and a female terminal blocks of each compartment.

The cathodes of the other LEDs 81b–81e are each connected by one pin of each of the terminal blocks of every compartment to the associated compartment. The other three pins of each terminal block are connected to the IPM, ICA, IAC inputs of microprocessor 1. Lastly, the eighth pin of each terminal block is connected to an emergency open interrupt input IOU of microprocessor 1. An IOC input of microprocessor 1 is connected between ground and normally open contacts C1–C5 formed by electric connections of the male terminal blocks. Each of the circuit elements of a compartment is connected to the female terminal block of the following compartment. Between each male and female connector of each adjacent pair of compartments is connected one of resistors 91 through 95; resistor 95 is connected to the supply voltage Vdd.

The input of emergency open interrupt (IOU) also is connected to an analog-digital converter, which can be a discrete integrated circuit located outside microprocessor 1, or can be implemented as software inside the microprocessor. Therefore, for the eight connection terminals of each modular compartment, a pillbox having five medication dispensing compartments can be formed.

Pillbox microprocessor 1 interacts with each of the pillbox modular compartments via interrupt inputs IPM, ICA, IOU and output port PA. Microprocessor 1 also interacts via bus $I_2C$ with a programmable non-volatile and electronically erasable read only memory (EEPROM) 104 and a calendar clock circuit 105 initiating clock interrupts. Clock circuit 105 is driven by quartz crystal 51. Bus $I_2C$ also is connected by display control circuit 60 to liquid crystal display 61; circuit is, e.g., marketed by Philips as PCF 8566. Bus $I_2C$ is a two-line control bus, having a first line containing the clock bus and a second line containing a digital-data line.

Microprocessor 1 also responds to a signal indicating the presence and absence of chip card 102, (having the size and shape of a credit card) in holder 54 of pillbox 2. To this end, the circuitry of pillbox 2 includes microswitch 25 having a first grounded terminal and a second terminal connected to an interrupt input IPONC of microprocessor 1. Microswitch 25 is open circuited and closed when chip card 102 is respectively absent from and in housing 54 of pillbox 2. Chip card 102 is a plastic sheet carrying microprocessor 20 connected by internal bus 26 to non-volatile read-only memory (ROM) 21, random access memory (RAM) 22, and to electronically erasable programmable non-volatile read-only memory (EEPROM) 23. As described in applicants' co-pending application Ser. No. 09/041,822, filed concurrently herewith, entitled "A Method of Forming an Electronic Pocket Pillbox and Prescription Writing Apparatus Used in the Method" (Lowe Hauptman Gopstein and Berner Docket 1013-008), incorporated by reference herein, EEPROM 23 is programmed by a physician with prescription data which are transferred from EEPROM 23 to microprocessor 1 under the control of a pharmacist. Internal bus 26 is connected to terminal board 24 which couples via an electric connector on the chip card the input-output data signals (I/O), the clock signal (CLK), reset-to-zero signal (RSI) and the chip card DC power supply voltage (Vcc). These signals and supply voltage are coupled to board 24 from chip card interface circuit 3 in pillbox 2. Interface circuit is preferably of the type sold by Philips as TDA8002A. Interface circuit 3 communicates with microprocessor 1 of pillbox 2 through four lines, viz.: a first line 30 connected to the microprocessor 1 input/output line, a second line 31 enabling the interface circuit operational mode to be determined, a third line 32 enabling card 102 to be reinitialized and a fourth line 33 for controlling the supply voltage Vcc applied to the card to allow voltage Vcc to be rapidly switched off when card 102 is withdrawn from housing 54 in pillbox 2.

Lastly, microprocessor 1 of pillbox 2 controls a sound-emitting element 83, e.g., a vibrator, for selectively emitting a sound audible by a person carrying or close to pillbox 2.

The memory of microprocessor 1 of the pillbox 2 includes a management program for (1) the interrupts IPM, IAC, IOU and IC, (2) signalling when the pillbox user is to take a pill, and (3) signalling movement of a pill from the compartments. When chip card 102 is put in place in holder 54 and pillbox 2, microprocessor 1 also carries out a management program to cause a data exchange between the microprocessor 1 and chip card 102 so that when the chip card is initially put in place, the data stored in the chip-card programmable memory 23 are transferred to the pillbox EEPROM 104, which functions as a prescription memory. When the program carried out by the pillbox microprocessor detects that the patient has taken all of the pills of a particular prescription, the pillbox write program causes transfer of pillbox prescription data stored in EEPROM 104 to card programmable memory 23.

Figure 2:
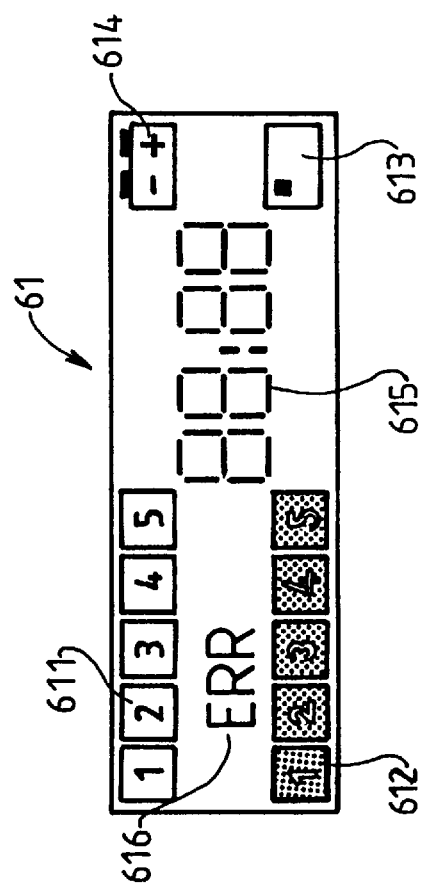
FIG. 2 is a topview of the pillbox display.

Microprocessor 1 of the pillbox 2 comprises a last program for managing LCD 61 that includes icons 611–614, numeric elements 615, and three alpha characters 616, FIG. 2. Icons 611, one of which is provided for each of the five different pillbox pill compartments, when activated, visually signal the numeral associated with the compartment. When one of icons 611 is activated, the number associated with the icon signals that the compartment corresponding to the displayed number has no pills located in it, i.e., is empty. Icons 612, are ordinarily not displayed so they normally appear dark on the screen. When microprocessor 1 activates icons 612 so a particular icon 612 has a dark color, the pillbox user is advised of the need to take a pill in the compartment associated with the illuminated number to take medications. Icon 613, when activated, indicates the presence of chip card 102 in pillbox 2. Icon 614, when activated, signals a substantial voltage drop in the supply voltage Vdd from its nominal value. If, for example, Vdd is normally 6.0 v, icon 614 is illuminated when Vdd is less than 4.4 v to signal the need to change the battery. Numeric and alpha zones 615, 616 respectively display the time and error messages that advise the pillbox user of anomalous operation.

In operation and once the various pillbox compartments have been mechanically and electrically connected and chip card 102 has been inserted into holder 54 in pillbox 2, the pillbox electronic circuitry is programmed to seek prescription data from EEPROM 23 in chip card 102 and to load memory 104 in pillbox 2 with the data about the prescription to be taken by the pillbox user. At this time, clock 105 at regular time intervals produces interrupts to check whether the actual time transmitted to the pillbox microprocessor 1 by the bus $I_2C$ corresponds to the pill ingestion time supplied by the prescription to memory 104. The prescription loaded into EEPROM 23 of chip card 102 and supplied to the memory of microprocessor 1 indicates the number of pills to be dispensed from each of the compartments of pillbox 2 at a particular time and the times when the pills are to be taken by the pillbox user.

If the actual time and stored time when a pill is to be taken are the same, microprocessor 1 is programmed to (1) read memory 104 to load the microprocessor with the number of the compartment containing the pill to be ingested and (2) supply a signal to the corresponding microprocessor output PA, causing activating of the LED 81 corresponding to the compartment from which the user is to take one or more pills. Microprocessor 1 simultaneously actuates vibrator 83. When the pillbox user sees a blinking LED 81, he pushes the button 11, 12 or 13 of the corresponding compartment. Pushing the button 11, 12 or 13 corresponding to the lit LED causes closure of the switch bcmi corresponding to the lit LED. In response to one of switches bcmi being closed, interrupt IAC is supplied to microprocessor 1 and a DC voltage having a value corresponding to the number of the closed switch is supplied via ICA to the microprocessor analog-to-digital converter CAN.

Analog-digital converter CAN thereby derives a digital output signal denoting the value of the resistor in series between the converter and the actuated switch. If the switch bcm5 of the fifth compartment is involved, five resistors 71–75 are series connected, whereas if the switch bcm1 is involved, only a single resistor 71 is connected to the input of the CAN converter. The different voltage levels at the converter input and the converter output permit microprocessor 1 to ascertain the number of the actuated compartment.

Actuating button bcm4 associated with compartment 4 causes mechanical rotation of door 14 of the holding space of compartment 4. The pill triggers closure of switch cpm1 as the pill moves past switch cpm1, provided compartment 4 still contains a pill. This closure of switch cpm1 causes an interrupt to be derived at input IPM of microprocessor 1.

Detection by microprocessor 1 of the two interrupts IAC and IPM in their consecutive order causes the microprocessor to monitor the proper sequence of pill ingestions and the efficacy of such ingestion. The presence of these two interrupts IAC and IPM following an interrupt IH corresponding to the time of medication ingestion causes microprocessor 1 to detect whether the medication was ingested in a time interval corresponding to nominal ingestion within an allowable time deviation, for instance, of 15 minutes.

If, for some reason, the pillbox user wishes to carry out an emergency pill ingestion, he can press the button bcmi of the compartment containing the desired pill. In such an instance, the use of the compartment as well as movement of the pill is recorded as an emergency withdrawal because the withdrawal was not performed within a time interval corresponding to the time-latitude of ingestion.

The program sensing there was no interrupt IH in a prior or subsequent time interval to medication-withdrawal for the compartment corresponding to the withdrawal comes to the above conclusion. Since removal of each pill from each compartment is detected, it is possible, using an appropriate program to count down the withdrawn pills and to count down in memory 104 a count initially loaded into the memory 104 indicative of the number of pills initially loaded into a particular compartment. The count is initially loaded from memory 23 of chip card 102. The count in memory 104 at any particular time indicates the number of pills remaining to be ingested in a particular compartment.

The pillbox microprocessor 1 is initially loaded with an operating program managing the interrupts and comprising a read-write module between the pillbox programmable memory 104 and the programmable memory 23 of chip card, i.e., detachable data medium, 102.

Detachable data medium 102 has in its memory 23 several files ORDO, FONC and PAT. The ORDO file is organized as a table having the following fields:

| NAME OF FIELD | TYPE |
|---|---|
| Prescription # | number |
| Date of prescription | date/hour |
| Compartment | number |
| No. of pills to be removed during each dispensing activity | number |
| No. of daily ingestions | number |
| Withdrawal times | memo |

The FONC file, also organized as a table, has the following fields:

| NAME OF FIELD | TYPE |
|---|---|
| Prescription # | number |
| Name of prescription | text |
| Number of compartment | number |
| Date opened | date/hour |
| No. of pills initially in each compartment | number |
| Times opened | text |

The PAT file, corresponding to the patient data, has the following fields:

| NAME OF FIELD | TYPE |
|---|---|
| Patient surname | text |
| Patient given name | text |
| Patient birth date | date/time |
| Patient Social Security Number | number |
| Prescription # | number |
| Prescription date | number |
| Number of treatment days | number |
| Name of physician | number and/or text |
| Identity of pillbox | number |
| Date of emergency access | date/time |
| Time of emergency access | date/time |

Optionally a "dosage" file, loaded in EEPROM 23, is transferred to memory 104 via microprocessor 1.

The pillbox operating program detects the disappearance of the emergency interrupt IOU by the closure of the switches c1 through c3 or c4 or c5 depending on the number of compartments assembled to form the pillbox allowing delivery of prescribed medications. The last compartment, associated with switch c5, is mechanically and electrically connected to the remainder of the pillbox to establish an electric connection from interrupt input IOU to power supply Vdd. When chip card 102 is inserted into holder 54, switch 25 closes and ground is connected to the IPONC input of microprocessor 1, erasing the interrupt due to the card not being in holder 54.

When microprocessor 1 detects disappearance of interrupts IOU and IPONC, i.e., detects the presence of card 102 in holder 54 and five compartments being in pillbox 2, its program carries out a program jump, to read data from EEPROM 23 of detachable medium 102 and write these data into programmable memory 104 of pillbox 2.

Therefore, the files ORDO, FONC and PAT are integrally transferred from memory 23 to memory 104. At the end of the file transfer, the program of microprocessor 1 connects to a clock-interrupt surveillance loop in the microprocessor that responds to the output of clock 105.

The operational file initially contains no data other than the prescription number, its date and the name of the pills, as well as the compartment number assigned to the medication. As time and events unfold, pillbox 2 updates the "Date Opening" and "Time Opening" fields so memory 104 stores the date the pillbox is opened, as well as the time the medications are taken and the number of pills that were withdrawn from the pillbox. Similarly, the PAT file, which initially contains data of patient surname, given name, date of birth, Social Security number, prescription number and date, number of treatment days, physician identity and pillbox identity, has gradually stored in its "emergency opening date" and emergency opening time" fields data signals representing the dates and times of emergency openings. When all medication in the prescription has been dispensed, these data in memory 104 are transferred back to EEPROM 23 and are subsequently sent from EEPROM 23 after the EEPROM has been removed from pillbox 2 so the physician and/or pharmacist can obtain information about the patient's use of the prescribed medication.

Lastly, for each clock interrupt caused by updating the time on the LCD display 61, the program also scans the memory 104 addresses corresponding to the fields "time of issuance" for each of the medications loaded into the pillbox in order to (1) determine whether clock time corresponds to an issuance time and (2) trigger the indicating signal of the compartment corresponding to the channel number.

The operations carried out in this manner maximally limit the problems associated with programming the pillbox and user-required interfaces. The operations also limit the number of required connections between the detachable compartments while enabling detection of medications actually taken or attempts to take medications even if a particular compartment no longer holds a pill. The operations also allow sensing premature disconnection of the compartments from the rest of the pillbox. This is especially important for a pocket modular pillbox having a design allowing matching the pillbox to the physician issued prescription and to optimize pillbox size. Moreover, the compartments may be fitted to issue either capsules or tablets of different sizes; the word "pill" is understood to be a generic term for both capsules and tablets.

While there has been described and illustrated a specific embodiment of the invention, it will be clear that variations in the details of the embodiment specifically illustrated and described may be made without departing from the true spirit and scope of the invention as defined in the appended claims.

What is claimed is:

1. A multi-compartment electronic pocket pillbox comprising a, memory, a microprocessor for loading prescription data from a detachable data medium into the memory, an indicator for each of the compartments, a pill dispenser in each of the compartments, a detector associated with each compartment for monitoring the movement of pills relative to each compartment; the memory, microprocessor, indicators and detectors being interconnected so that the indicators are provided with signals indicative of which dispenser is to be activated as a function of the prescription data and the movement of medication relative to each compartment.

2. The electronic pocket pillbox of claim 1 wherein the memory microprocessor and detector are arranged so the memory records pills withdrawal and the microprocessor includes a counter responsive to the detector for counting down at each pills withdrawal so the counter stores a count indicative of the remaining number of medications in each compartment.

3. The electronic pocket pillbox of claim 2 wherein the microprocessor is responsive to the dispenser and a clock for sensing an emergency pills withdrawal and for recording the emergency withdrawal in a file of the memory.

4. The multi-compartment electronic pocket pillbox of claim 1 further including a display responsive to the microprocessor for displaying signals indicative of pillbox activity.

5. The electronic pocket pillbox of claim 1 wherein the compartments are detachable from the remainder of the pillbox, the compartments including contacts coupled with the microprocessor for enabling and comprising mutual connection pillbox integrity checking.

6. The electronic pocket pillbox of claim 5 further including circuitry for determining the number of pillbox compartments included in the pillbox.

7. The electronic pocket pillbox of claim 1 further including a detector for the presence of the detachable data medium in the pillbox.

8. The electronic pocket pillbox of claim 1 wherein the detachable data medium is a chip card including a microprocessor and a programmable non-volatile memory.

9. The electronic pocket pillbox of claim 1 wherein the detecting movement detector in each compartment includes an electric switch actuated by the pills moving through a door of each compartment.

10. The electronic pocket pillbox of claim 1 further including circuitry for determining the compartments from which medication is dispensed, the compartment-determining circuitry including a voltage divider having multiple taps and an output terminal connected to an analog-digital converter, the taps being connected by switches controlled by the drive buttons of the dispensers of the respective compartments to supply differing voltage magnitudes indicative of the activated switches to the voltage divider output terminal and the converter.

11. The electronic pocket pillbox of claim 1 wherein the microprocessor is connected to the detectors for detecting and recording the pillbox user's execution of the prescription, emergency withdrawals and operational incidents.

12. The electronic pocket pillbox of claim 1 wherein the microprocessor is programmed for managing exchanges between the pillbox memory and the detachable data medium for (a) loading the pillbox memory with prescription data in the detachable data medium when the integrity of the pillbox is detected and (b) loading the detachable data medium with a sequence of treatment and emergency withdrawals stored in the pillbox memory.

13. The electronic pocket pillbox of claim 12 wherein the treatment sequence and the emergency withdrawals are loaded into the detachable data medium when all the pills of the prescription are detected by the microprocessor as being dispensed.

14. The electronic pocket pillbox of claim 12 wherein the treatment sequence and the emergency withdrawal are loaded into the detachable data medium during each interrupt initiation.

15. The multi-compartment, electronic pocket pillbox of claim 5 wherein the microprocessor is electrically connected to each compartment, each of said compartments having a door through which pills units in the compartment pass, a detector for detecting actuation of the door, the actuation detector including a switch driven by a dispensing button for controlling the door of each compartment, said switch being connected between a resistor associated with the compartment and an electric power source for the microprocessor, each resistor of each compartment being series connected with that of the following compartment and connected by an additional resistor to an input of an analog-digital converter for determining the compartment identity as a function of the amplitude of analog-to-digital converter input signals.

* * * * *